(12) United States Patent
Chen

(10) Patent No.: US 12,742,503 B2
(45) Date of Patent: Sep. 22, 2026

(54) ELECTRONIC RELIEF VALVE DEVICE

(71) Applicant: Chi-Wen Chen, New Taipei City (TW)

(72) Inventor: Chi-Wen Chen, New Taipei City (TW)

( * ) Notice: Subject to any disclaimer, the term of this patent is extended or adjusted under 35 U.S.C. 154(b) by 94 days.

(21) Appl. No.: 19/035,712

(22) Filed: Jan. 23, 2025

(65) Prior Publication Data

US 2026/0210444 A1 Jul. 23, 2026

(51) Int. Cl.
*B60C 29/06* (2006.01)
*F16K 3/24* (2006.01)
*F16K 31/04* (2006.01)

(52) U.S. Cl.
CPC .............. *F16K 3/24* (2013.01); *B60C 29/068* (2013.01); *F16K 31/046* (2013.01); *F16K 31/047* (2013.01)

(58) Field of Classification Search
CPC ..... B60C 29/068; F16K 15/207; F16K 24/04; F16K 31/046
See application file for complete search history.

(56) References Cited

U.S. PATENT DOCUMENTS 4,015,624 A * 4/1977 Wanstreet ............... F16K 15/20 137/232
2007/0295075 A1* 12/2007 Kiefer ..................... B60S 5/043 73/146.8
2020/0408205 A1* 12/2020 Chen ....................... F04B 49/08
2021/0254733 A1* 8/2021 Wu ....................... F16K 15/207
2022/0288981 A1* 9/2022 McGhee ............... B60C 23/004

* cited by examiner

*Primary Examiner* — Kelsey E Cary
(74) *Attorney, Agent, or Firm* — Leong C. Lei

(57) ABSTRACT

An electronic relief valve device includes an electronic control module including a driving motor and a pressure transducer electrically connected to a control circuit board, a three-way pipe connected to the pressure transducer and having a gas release aperture formed in a gas channel thereof, and a slidable member sleeved on the gas channel and closing the gas release aperture. When the pressure value of gas of an external inflatable object (such as a tire) is greater than a pressure relief value set in the control circuit board, the control circuit board controls the driving motor to drive the slidable member away from the gas release aperture of the three-way pipe, allowing the gas inside the inflatable object to release through the gas release aperture of the three-way pipe. Thus, accurately determining if to activate an automatic gas release operation can be achieved.

10 Claims, 5 Drawing Sheets

ELECTRONIC RELIEF VALVE DEVICE

BACKGROUND OF THE INVENTION

(a) Technical Field of the Invention

The present invention relates generally to an electronic relief valve device, and more particularly to an electronic relief valve device that detects the pressure value of gas inside an external inflatable object to determine if to activate an automatic gas release operation.

(b) Description of the Prior Art

Car tires or various inflatable items (such as inflatable beds, inflatable boats, etc.) mainly need to use an inflator as an inflation accessory to effectively save manpower and time. In addition, car tires need an inflator as an inflation device to accurately control the tire pressure and avoid insufficient or over-inflation of the tire.

For vehicles (such as beach buggies) that are used in certain special terrains and environments (such as beaches or deserts), the tire pressure must be released and deflated to a value lower than the normal tire pressure, such as a tire pressure value lower than 2.4 bar (35 PSI), so that the beach buggy can drive on the sand easily and avoid the tires getting stuck in the sand. Therefore, the deflation procedure required by the beach buggy is a very important control procedure for driving on the beach.

However, the tire deflation operation is still mainly completed manually by pressing the tire valve to deflate the tire. In order to avoid excessive tire deflation during the deflation process, the user must repeatedly detect the tire pressure with a pressure gauge. If the required deflation pressure value is not reached, the tire is continued to be manually deflated. If the tire pressure is excessively deflated, the tire must be re-inflated by an inflator. As such, repeated time-consuming and laborious operations are bound to be quite frustrating and inconvenient.

Thus, how to provide an electronic relief valve device that detects the pressure value of gas of an external inflatable object to determine whether to start an automatic gas release operation is the main issue of the present invention.

SUMMARY OF THE INVENTION

The primary objective of the present invention is to provide an electronic relief valve device, which comprises an electronic control module, a three-way pipe, and a slidable member. The electronic control module comprises a control circuit board, and the control circuit board is electrically connected with a driving motor, a pressure transducer, and a power supply unit. The power supply unit supplies electrical power to the control circuit board, the driving motor, and the pressure transducer. The driving motor is combined with a lead screw. The control circuit board can be set with a pressure relief value, and can compare the pressure relief value with the pressure value detected by the pressure transducer. The three-way pipe comprises a first gas channel, a second gas channel, and a third gas channel. The first gas channel is connected to a pneumatic chuck, and the pneumatic chuck is connectable with a nozzle of a predetermined external inflatable object to allow gas inside the inflatable object to pass through the pneumatic chuck to flow into the three-way pipe. The second gas channel has an open end that is connected to the pressure transducer. The third gas channel has an end that is close and a sidewall that is formed with at least one gas release aperture. The slidable member comprises a first hollow tube and a second hollow tube. The first hollow tube is provided with a thread formed on an inside wall thereof for screwing onto the lead screw, so that the slidable member is linearly movable along the lead screw. The second hollow tube is sleeved on an outside of the third gas channel and closes the gas release aperture.

As such, the pneumatic chuck is connected with the nozzle of the predetermined external inflatable object (such as a tire), so that the gas inside the inflatable object passes through the pneumatic chuck and the first gas channel to flow into the three-way pipe. The pressure transducer detects the pressure value of the gas inside the inflatable object. If the pressure value of the gas inside the inflatable object is greater than the pressure relief value set in the control circuit board, the control circuit board controls the driving motor to start, and the driving motor drives the lead screw to move the second hollow tube of the slidable member away from the gas release aperture of the third gas channel, so that the gas inside the inflatable object can be released through the gas release aperture to perfectly achieve a function of accurately releasing gas from the inflatable object.

DETAILED DESCRIPTION OF THE PREFERRED EMBODIMENTS

Figure 1:
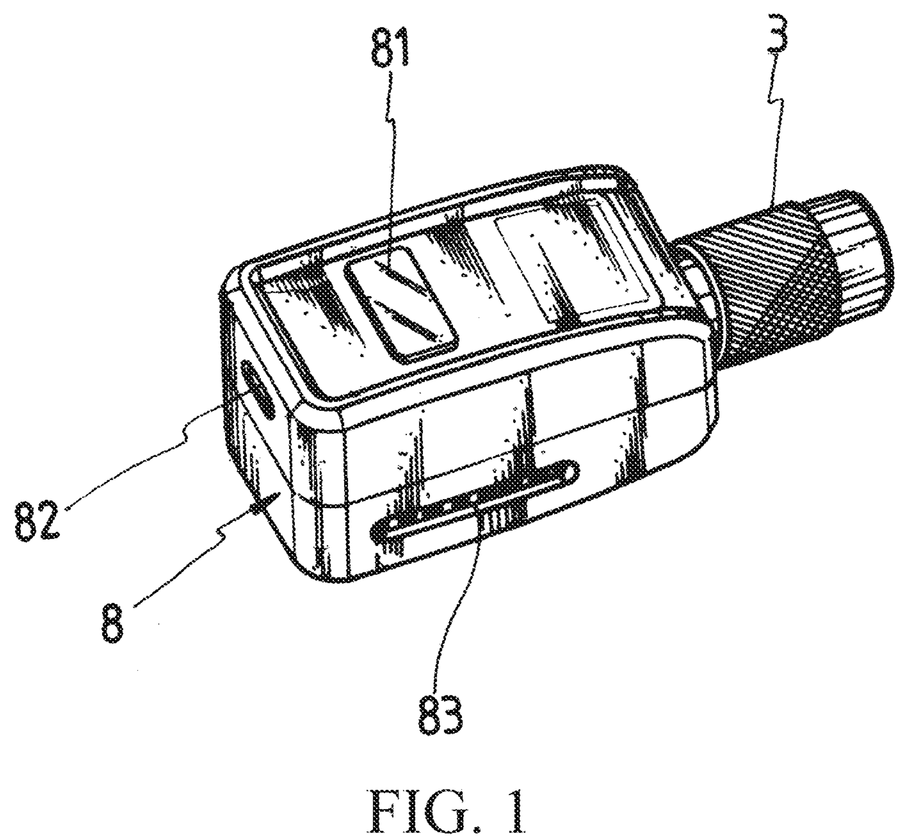
FIG. 1 is a perspective view showing an electronic relief valve device according to the present invention.
Figure 2:
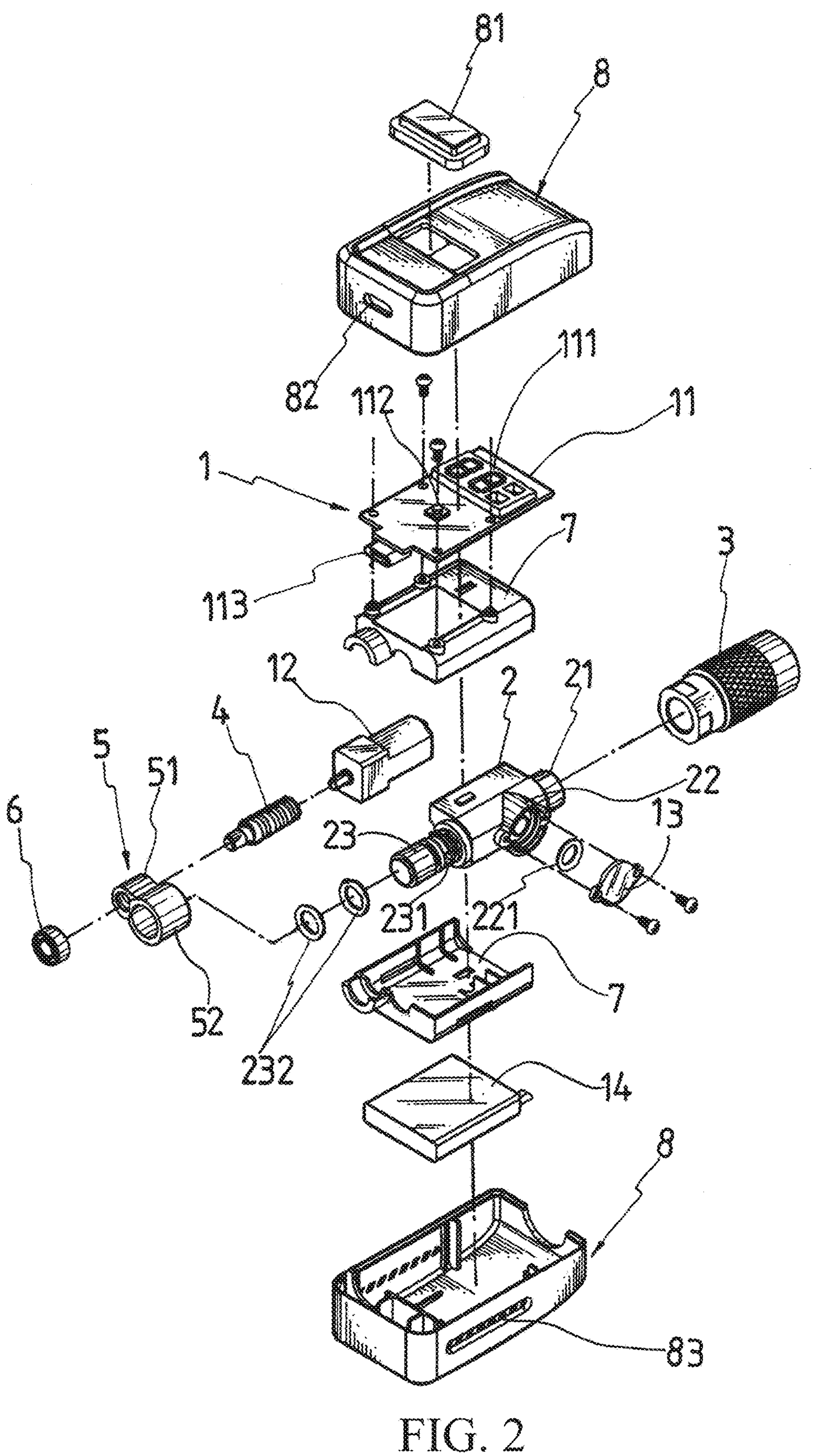
FIG. 2 is an exploded view showing the electronic relief valve device according to the present invention.
Figure 3:
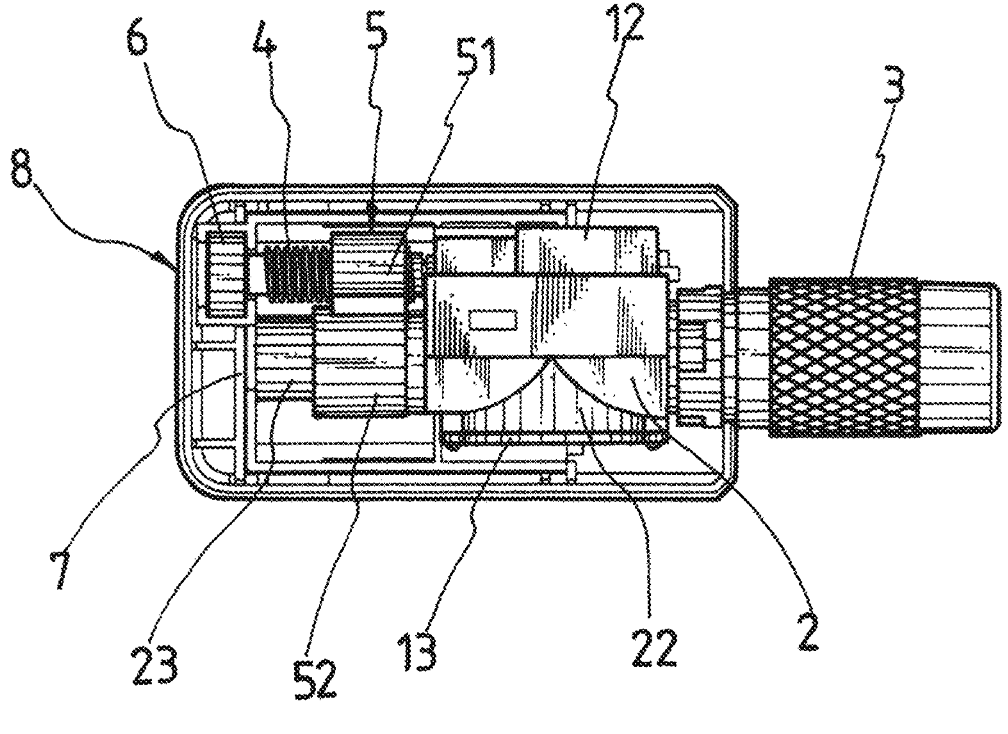
FIG. 3 is a top plan view showing inside structure of the electronic relief valve device according to the present invention.
Figure 4:
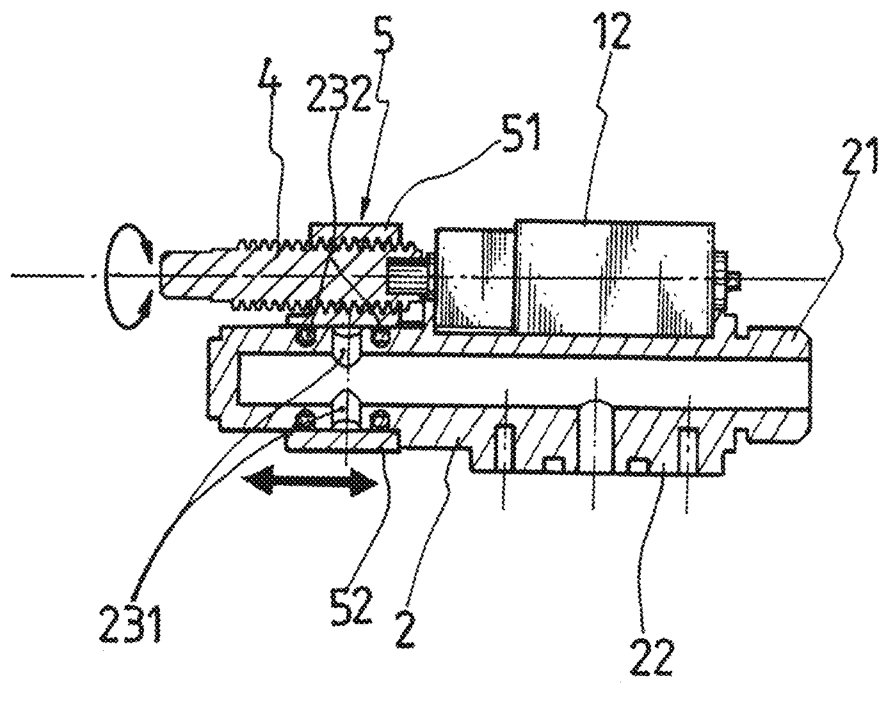
FIG. 4 is a cross-sectional view of certain components of the electronic relief valve device according to the present invention for illustrating a control operation thereof.
Figure 5:
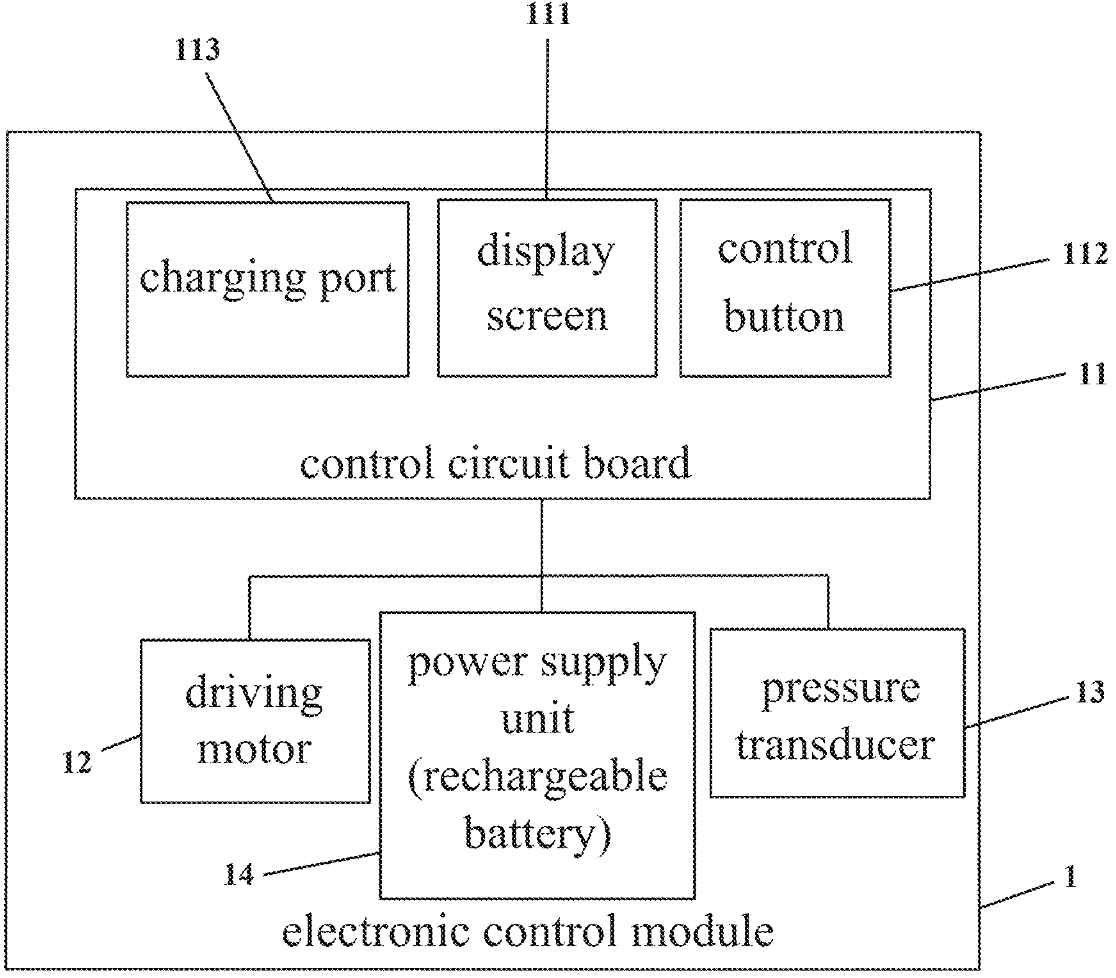
FIG. 5 is schematic view showing architecture of an electronic control module of the electronic relief valve device according to the present invention, as an example for illustration.

Referring to FIGS. 1, 2, 3, 4, and 5, the present invention discloses an electronic relief valve device, which comprises an electronic control module 1, a three-way pipe 2, a slidable member 5, an inner casing 7, and an outer casing 8.

The electronic control module 1 comprises a control circuit board 11, the control circuit board 11 is provided, in electrical connection therewith, a display screen 111, at least one control button 112, and a charging port 113. The control circuit board 11 is also electrically connected to a driving motor 12, a pressure transducer 13, and a power supply unit 14. The driving motor 12 has a spindle to which a lead screw 4 is connected. The pressure transducer 13 is operable to detect a pressure value of gas inside an external inflatable object and to transmit the pressure value of gas inside the external inflatable object to the control circuit board 11 to carry out signal processing. The power supply unit 14 supplies electrical power to the control circuit board 11, the driving motor 12, and the pressure transducer 13. The power supply unit 14 can be rechargeable battery (such as a lithium battery). The control circuit board 11 comprises at least one microcontroller, so as to allow the control circuit board 11 to carry out processing and controlling of signals. The control circuit board 11 allows a user to set a pressure relief value, and to compare the pressure relief value with the pressure value detected by the pressure transducer. The charging port 113 can be of a specification of one of USB Type-A, USB Type-B, and USB Type-C.

The three-way pipe 2 is provided with a first gas channel 21, a second gas channel 22, and a third gas channel 23. The first gas channel 21 is connected to a pneumatic chuck 3, and the pneumatic chuck 3 is connectable with a nozzle provided on a predetermined external inflatable object, so gas inside the inflatable object may flow through the pneumatic chuck 3 and the first gas channel 21 to get into the three-way pipe 2. An open end of the second gas channel 22 is connected to the pressure transducer 13, and an open end of the second gas channel 22 is provided with a first sealing ring 221, so as to allow the pressure transducer 13 to connect, in a hermetical manner, to the open end if the second gas channel 22. An end of the third gas channel 23 is closed and is formed, on a lateral side thereof, with at least one gas release aperture 231. A second sealing ring 232 is arranged on the outside of the third gas channel 23 at each of two opposite sides of the gas release aperture 231.

The slidable member 5 comprises a first hollow tube 51 and a second hollow tube 52. An inside wall of the first hollow tube 51 is formed with a thread screwed to a lead screw 4 so as to allow the slidable member 5 is linearly movable along the lead screw 4 reciprocally. The second hollow tube 52 is sleeved on the outside of the third gas channel 23 of the three-way pipe 2 and closes the gas release aperture 231. The second hollow tube 52 is set in tight and hermetic engagement with the two second sealing rings 232 on the outside of the third gas channel 23, so that the second hollow tube 52 can hermetically close the gas release aperture 231.

The inner casing 7 is made up of upper and lower casing members, and the inner casing 7 is arranged to mount the driving motor 12, the lead screw 4, the three-way pipe 2, and the slidable member 5 in position, with the pneumatic chuck 3 connected to the first gas channel 21 of the three-way pipe 2 extending out of the inner casing 7. A bearing 6 is arranged in an interior of the inner casing 7, and the bearing 6 is fit over an end of the lead screw 4 (namely the end that is not connected to the driving motor 12).

The outer casing 8 is made up of upper and lower casing members. The outer casing 8 is set to enclose the inner casing 7, the control circuit board 11, and the power supply unit 14. The control circuit board 11 is located in a top portion of the inner casing 7, while the power supply unit 14 is located in a bottom portion of the inner casing 7. The pneumatic chuck 3 connected to the first gas channel 21 of the three-way pipe 2 extends out of the outer casing 8. The outer casing 8 is provided with a push button 81, a charging opening 82, and a plurality of gas discharge holes 83. The push button 81 corresponds to the control button 112 of the control circuit board 11, so that pressing down the push button 81 may correspondingly press down the control button 112. The charging opening 82 corresponds to the charging port 113 of the control circuit board 11, so that a charging plug of an external power cable is insertable into the charging opening 82 to establish electrical connection with the charging port 113 to therefore allow the external power cable to transmit electrical power to charge the power supply unit 14.

An example is provided to illustrate an operation mode for setting the electronic control module 1 according to the present invention:

Operation mode 1: the push button 81 is first pressed down (namely pressing down the control button 112) to activate the electronic relief valve device (namely powering and activating the control circuit board 11), and at this moment, with the pressure transducer 13 not detecting an external pressure value, the push button 81 can be pressed down again to set up a desired pressure relief value for the control circuit board 11.

Operation mode 2: the push button 81 is first pressed down (namely pressing down the control button 112) to activate the electronic relief valve device (namely powering and activating the control circuit board 11); and at this moment, if the pressure transducer 13 detects an external pressure value, and the external pressure value is greater than the pressure relief value set in the control circuit board 11, the push button 81 can be pressed down again to make the control circuit board 11 controls the driving motor 12 to start for rotating in a direction (such as rotating clockwise) in order to carry out a gas release operation (further details of the gas release operation will be provided below), until the pressure transducer 13 detects the external pressure value equal to or smaller than the pressure relief value, and then instructs the control circuit board 11 to control the driving motor 12 to start for rotating in an opposite direction (such as rotating counterclockwise), so as to stop the gas release operation.

The pressure value detected by the pressure transducer 13 and the pressure relief value set in the control circuit board 11 can both be displayed for the digital values thereof on the display screen 111.

An example of use and operation of the electronic relief valve device according to the present invention will be provided. After the control circuit board 11 is set with a pressure relief value, the pneumatic chuck 3 is connected to a nozzle of a predetermined external inflatable object (such as a tire) to allow gas inside the inflatable object to pass through the pneumatic chuck 3 and the first gas channel 21 to flow into the three-way pipe 2 so that the pressure transducer 13 may detect the pressure value of the gas inside the external inflatable object. If the pressure value of the gas inside the external inflatable object is greater than the pressure relief value set in the control circuit board 11, the control circuit board 11 controls the driving motor 12 to start, and the driving motor 12 drives the lead screw 4 to rotate in a direction (such as rotating clockwise). The clockwise rotation of the lead screw 4 drives the first hollow tube 51 and the second hollow tube 52 of the slidable member 5 to synchronously move in a direction toward the bearing 6. In other words, the driving motor 12 drives the second hollow tube 52 of the slidable member 5 to move away from the gas release aperture 231 of the third gas channel 23 so as to allow the gas inside the external inflatable object to discharge through the gas release aperture 231, achieving release of gas from the inflatable object. The gas released from the external inflatable object is discharged to the outside through the plurality of gas discharge holes 83 formed in the outer casing 8.

If the pressure transducer 13 detects the pressure value of the gas inside the external inflatable object equal to or smaller than the pressure relief value set in the control circuit board 11, the control circuit board 11 controls the driving motor 12 to start and the driving motor 12 drives the lead screw 4 to rotate in an opposite direction (such as rotating counterclockwise). The counterclockwise rotation of the lead screw 4 drives the first hollow tube 51 and the second hollow tube 52 of the slidable member 5 to synchronously move in a direction toward the gas release aperture 231. In other words, the driving motor 12 drives the second hollow tube 52 of the slidable member 5 to close the gas release aperture 231 of the third gas channel 23, thereby stopping release of gas from the inflatable object.

In summary, the main technical feature of the present invention is that the control circuit board 11 is electrically connected to the driving motor 12 and the pressure transducer 13, and the control circuit board 11 can be set with a pressure relief value; the first gas channel 21 and the second gas channel 22 of the three-way pipe 2 are respectively connected to an external inflatable object and the pressure transducer 13, and the third gas channel 23 is formed with the gas release aperture 231, wherein the driving motor 12 drives the slidable member 5 to realize control over the gas release aperture 231 of the third gas channel 23 for closing and stopping gas release or opening and enabling gas release; in other words, when the pressure value of the gas inside the external inflatable object is greater than the pressure relief value set in the control circuit board 11, the control circuit board 11 controls the driving motor 12 to start and the driving motor 12 drives the slidable member 5 to open the gas release aperture 231 of the third gas channel 23 so as to allow the gas inside the inflatable object to release through the gas release aperture 231, and therefore achieving accurate determination through the electronic control module 1 as to whether to activate an automatic gas release process for an inflatable object and achieve an accurate pressure value after the release of gas.

I claim:

1. An electronic relief valve device, comprising:

an electronic control module, which comprises a control circuit board, the control circuit board being electrically connected with a driving motor, a pressure transducer, and a power supply unit, the power supply unit supplying electrical power to the control circuit board, the driving motor, and the pressure transducer, the driving motor being combined with a lead screw, the control circuit board being operable to set up a pressure relief value, and compare the pressure relief value with a pressure value detected by the pressure transducer;

a three-way pipe, which comprises a first gas channel, a second gas channel, and a third gas channel, the first gas channel being connected to a pneumatic chuck, the pneumatic chuck being connectable with a nozzle of a predetermined external inflatable object, the second gas channel having an open end connected to the pressure transducer, the third gas channel having an end that is close and a sidewall that is formed with at least one gas release aperture; and a slidable member, which comprises a first hollow tube and a second hollow tube, the first hollow tube being provided with a thread formed in an inside wall thereof and screwed onto the lead screw, so that the slidable member is reciprocally and linearly movable along the lead screw, the second hollow tube being sleeved over an outside of the third gas channel and closing the gas release aperture;

wherein the pneumatic chuck is connectable with the nozzle of the inflatable object and the pressure transducer detects a pressure value of gas inside the inflatable object, so that when the pressure value of the gas inside the inflatable object is greater than the pressure relief value, the control circuit board controls the driving motor to start and the driving motor drives the lead screw to move the second hollow tube of the slidable member away from the gas release aperture, to allow the gas inside the inflatable object to release through the gas release aperture.

2. The electronic relief valve device according to claim 1, wherein the control circuit board is provided with a display screen, at least one control button, and a charging port arranged thereon and electrically connected thereto.

3. The electronic relief valve device according to claim 2, wherein when the control button is pressed down, the control circuit board is powered and activated, and when the pressure transducer does not detect the external pressure value, pressing down the control button again sets up the pressure relief value in the control circuit board.

4. The electronic relief valve device according to claim 2, wherein when the control button is pressed down, the control circuit board is powered and activated, and when the pressure transducer detects the external pressure value and the external pressure value is greater than the pressure relief value set in the control circuit board, pressing down the control button again makes the control circuit board control the driving motor to start and rotate in a direction.

5. The electronic relief valve device according to claim 4, wherein when the pressure transducer detects the pressure value equal to or smaller than the pressure relief value, the control circuit board controls the driving motor to start and rotate in an opposite direction.

6. The electronic relief valve device according to claim 1, wherein a first sealing ring is arranged at the open end of the second gas channel to allow the pressure transducer to hermetically connect to the open end of the second gas channel.

7. The electronic relief valve device according to claim 1, wherein a second sealing ring is arranged on the outside of the third gas channel at each of two sides of the gas release aperture.

8. The electronic relief valve device according to claim 1, further comprising an inner casing, wherein the inner casing supports the driving motor, the lead screw, the three-way pipe, and the slidable member in position, and the pneumatic chuck connected to the first gas channel extends out of the inner casing, a bearing being arranged in an interior of the inner casing, the bearing being fit to an end of the lead screw.

9. The electronic relief valve device according to claim 8, further comprising an outer casing, wherein the outer casing encloses the inner casing, the control circuit board, and the power supply unit, and the pneumatic chuck connected to the first gas channel extends out of the outer casing.

10. The electronic relief valve device according to claim 9, wherein the control circuit board is provided with at least one control button and a charging port electrically connected thereto, and the outer casing is provided with a push button, a charging opening, and a plurality of gas discharge holes, the push button corresponding to the control button of the control circuit board, the charging opening corresponding to the charging port of the control circuit board, such that a charging plug of an external power cable is insertable into the charging opening to establish electrical connection with the charging port to allow the external power cable to transmit electrical power to charge the power supply unit.

* * * * *